(12) United States Patent
Fanning

(10) Patent No.: US 6,880,111 B2
(45) Date of Patent: Apr. 12, 2005

(54) BOUNDING DATA TRANSMISSION LATENCY BASED UPON A DATA TRANSMISSION EVENT AND ARRANGEMENT

(75) Inventor: Blaise B. Fanning, El Dorado Hils, CA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 09/999,617

(22) Filed: Oct. 31, 2001

(65) Prior Publication Data

US 2003/0084029 A1 May 1, 2003

(51) Int. Cl.[7] .............................................. G06F 11/00
(52) U.S. Cl. .............................. 714/39; 714/37; 714/43
(58) Field of Search .............................. 714/37, 39, 43, 714/4

(56) References Cited

U.S. PATENT DOCUMENTS

| | | | |
|---|---|---|---|
| 5,758,053 A | * 5/1998 | Takeuchi et al. ................ | 714/4 |
| 5,802,263 A | * 9/1998 | Dittmar et al. ................. | 714/4 |
| 6,330,639 B1 | 12/2001 | Fanning et al. | |
| 6,438,707 B1 | * 8/2002 | Ronstrom ..................... | 714/13 |
| 6,467,031 B1 | 10/2002 | Fanning | |
| 6,496,894 B1 | 12/2002 | Fanning | |
| 6,523,092 B1 | 2/2003 | Fanning | |
| 6,604,186 B1 | 8/2003 | Fanning | |
| 6,615,308 B1 | 9/2003 | Fanning | |
| 6,625,695 B1 | 9/2003 | Fanning | |
| 6,631,476 B1 | * 10/2003 | Vandesteeg et al. ........... | 714/4 |
| 6,640,312 B1 | * 10/2003 | Thomson et al. .............. | 714/5 |
| 6,650,586 B1 | 11/2003 | Fanning | |
| 6,684,311 B1 | 1/2004 | Fanning | |
| 6,701,459 B1 | * 3/2004 | Ramanathan et al. ......... | 714/37 |
| 6,701,469 B1 | 3/2004 | Matter et al. | |
| 2002/0007468 A1 | * 1/2002 | Kampe et al. ................. | 714/4 |
| 2002/0069352 A1 | 6/2002 | Fanning | |
| 2003/0081558 A1 | 5/2003 | Fanning | |
| 2003/0084029 A1 | 5/2003 | Fanning | |
| 2003/0135682 A1 | 7/2003 | Fanning | |
| 2003/0145134 A1 | 7/2003 | Wehage | |
| 2003/0158992 A1 | 8/2003 | Ajanovic et al. | |

OTHER PUBLICATIONS

Abandoned U.S. Appl. No. 09/467,106 filed on Dec. 10, 1999; entitled Method and Apparatus for Peripheral Component Interface Bus Speed Selection.

Rohit Chhabra, Intel Communication Group, Intel Corporation; Why Build Products Based on Third Generation I/O Architecture?; Copyright 2001, Compaq Computer Corp., Dell Computer Corp., Intel Corp., International Business Machines Corp., Microsoft Corp.; No. of pages—2.

Ajay V. Bhatt, Technology & Research Labs, Intel Corporation; Creating a Third Generation I/O Interconnect; Copyright 2001, Compaq Computer Corp., Dell Computer Corp., Intel Corp., International Business Machines Corp., Microsoft Corp.; pp. —1–8.

Ajay V. Bhatt, Creating a Third Generation IO Bus; Intel Developer Forum Fall 2001; Intel Labs; Aug. 27–30, 2001, pp. 1–29.

Gerald Holzhammer, Creating a Third Generation I/O Bus; Intel Developer UPDATE Magazine; Sep. 2001; pp. 1–5.

* cited by examiner

*Primary Examiner*—Nadeem Iqbal
*Assistant Examiner*—Timothy M. Bonura
(74) *Attorney, Agent, or Firm*—Jeffery B. Huter

(57) ABSTRACT

A method, apparatus, system, and machine-readable medium to bound data transmission latency by transmitting error verification data at a point during a data transmission related to a data transmission event is provided. Embodiments may comprise receiving an indication of a data transmission event, such as an end of a packet, and transmitting error verification data to a target device based upon the indication. More specifically, some embodiments transmit error verification data at an end of a packet to balance transmission latency against the bandwidth available from a communication medium.

38 Claims, 4 Drawing Sheets

BOUNDING DATA TRANSMISSION LATENCY BASED UPON A DATA TRANSMISSION EVENT AND ARRANGEMENT

FIELD OF INVENTION

The present invention is in the field of data transmission. More particularly, the present invention provides a method, apparatus, system, and machine-readable medium to bound data transmission latency by transmitting error verification data at a point during a data transmission related to a data transmission event, such as an end of a packet.

BACKGROUND

System interconnection models describe three layers controlling aspects of data transmission: transaction layer, data link layer, and physical layer. Each layer independently performs tasks to successfully transmit data from a source device to a target device. The transaction layer, for example, may comprise a packet-based protocol to packetize or encapsulate data for transmission. The packet-based protocol sizes the packets of data to optimize transmission through several network devices. The data link layer inserts packet sequence numbers and error verification data, such as symbols and checksums, to verify data integrity during the transmission. Lastly, the physical layer reformats the data to optimize transmission of the data across a physical interconnection, or communication medium, and a physical layer at the target device reassembles the data.

The link layers at the source device and target device maintain data integrity by performing verifications of the data such as disparity and checksum verifications. Disparity verifications monitor the running disparity of a data transmission. For example, an eight bit/ten bit (8b/10b) encoding scheme balances the count of logical ones and logical zeros so that the numbers of each are substantially equivalent. When ten bits are sent having more logical ones than logical zeros, a subsequent transmission will have more logical zeros than ones, flipping the running disparity from more logical ones to more logical zeros, or from one heavy to zero heavy. When ten bits are sent with equal numbers of ones and zeroes, such a symbol is said to have "neutral" disparity. In some situations, a large number of neutral symbols are transmitted between non-neutral symbols so the source link layer inserts symbols that artificially cause a transition in the disparity. The target link layer constantly monitors the changes in disparity. When the disparity changes inappropriately, an error is assumed to have corrupted the data. Similarly, in checksum verifications, a source device incorporates data, called a checksum, into a data transmission comprising a summation of logical zeros and/or logical ones. The target device's link layer receives the checksum and compares it to a summation maintained by the target device. When the summations do not match, an error is assumed to have occurred in the data transmitted since the last checksum. In response, the target device requests a retransmission of the data since the last checksum or, in some cases, simply discards the response.

The number of symbols for disparity checks or checksums inserted into the data stream affects the bandwidth of the communication medium and the latency of the data transmission. The bandwidth of a communication medium is a measure of the amount of data that can transmit between a source device and a target device via the communication medium per unit of time. The latency of a data transmission across that medium is a measure of the average amount of time that elapses between requesting the transmission of data at the source device and verification of the data by the target device, thereby allowing the target device to use the data. Latency is adversely affected when error verification data, sometimes referred to as an error verification token, is not transmitted often enough, since the target device is proscribed from using the data until it has been verified. Link layers insert error verification data at a fixed frequency or transaction layers embed the data directly into the packets. Inserting the error verification data at a fixed frequency does not take into account the size of packets, for instance, an important factor for determining a balance of latency against bandwidth. When error verification data is received prior to receiving a complete packet, the packet may not be used until the remainder of the packet is verified, or when the next error verification data is received. On the other hand, the method of inserting verification data into each packet significantly restricts the functionality and potential functionality of the data link layer.

BRIEF FIGURE DESCRIPTIONS

In the accompanying drawings, like references may indicate similar elements:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
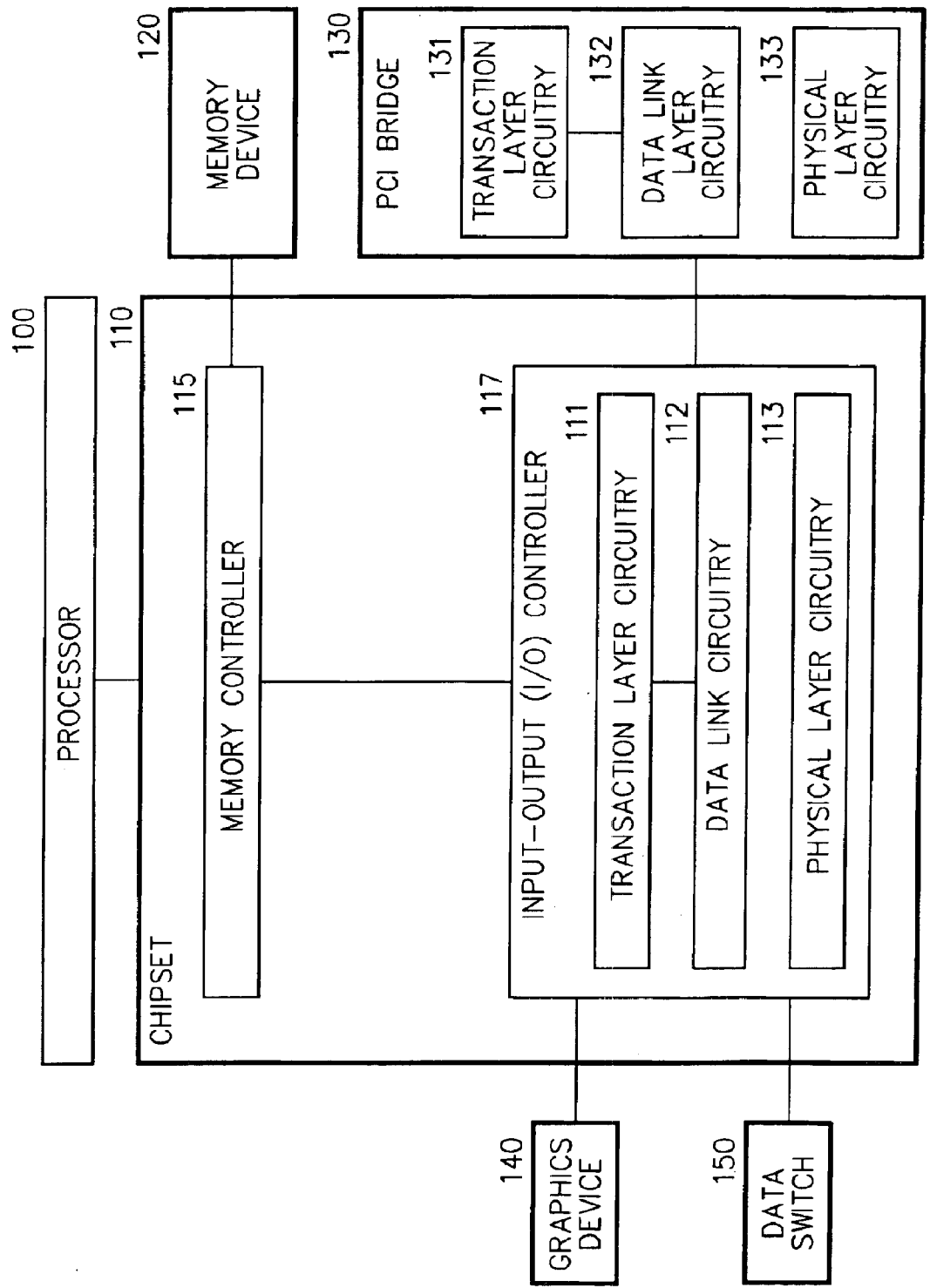
FIG. 1 depicts an embodiment to bound data transmission latency.

Referring now to FIG. 1, there is shown an embodiment to bound data transmission latency based upon a data event, or data transmission event. The arrangement may be a computer system such as a system for a desktop personal computer, notebook computer and/or server. The embodiment comprises a processor 100, chipset 110, memory device 120, peripheral component interconnect (PCI) bridge 130, graphics device 140, and data switch 150. Processor 100 may execute instructions in response to requests from operating system software and application software. Processor 100 may be coupled to chipset 110 to access the contents of memory in memory device 120 and receive data from or transmit data to PCI bridge 130, graphics device 140, and data switch 150.

Chipset 110 may access memory contents of memory device 120 and relay data and code between processor 100 and input and output (I/O) devices, such as PCI bridge 130, graphics device 140, and data switch 150. Chipset 110 may comprise a memory controller 115 and an input-output controller (I/O controller) 117. Memory controller 115 may be coupled to memory device 120, to access memory contents of memory device 120 in response to instructions from I/O devices and/or processor 100.

I/O controller 117 may be coupled to graphics device 140 to provide a dedicated high-speed port for a graphics controller. This coupling may be accomplished via transaction layer circuitry 111 that uses a packet-based protocol, data link layer circuitry 112 to verify data integrity, and physical layer circuitry 113 to move data across a communication medium. Transaction layer circuitry 111 may encapsulate data for transmission to graphics device 140 and a packet may comprise a header and data. Data link layer circuitry 112 of chipset 110 may couple to the transaction layer circuitry 111 to associate data events such as the transmission of the last unit of data, such as a byte, word, or double word, of a packet across the communication medium between memory controller 115 and graphics device 140. Frequent reference is made here in to transmissions between I/O controller 117 and graphics device 140. It should be understood, however, that embodiments may encompass transmissions between any two devices with a transaction layer, data link layer, and physical layer.

In some embodiments, the data link layer circuitry 112 may add a packet sequence number to the packet and add error verification data to the data transmission after the last byte, word, or d-word of the packet may be transmitted from the memory controller 115 to the graphics device 140. The packet sequence number and error verification data may facilitate the identification of errors in the data transmission by link layer circuitry of graphics device 140. In some embodiments, graphics device 140 may wait for the error verification data before releasing data of the data transmission for use.

The data link layer circuitry 112 of I/O controller 117 may comprise a data transmission queue, buffer, and verification circuitry. The data transmission queue may receive data to transmit from the transaction layer and store the data until the data may be transmitted. For example, the transaction layer circuitry 111 may packetize data and forward 4 bytes of the packet to the data transmission queue every clock cycle. When the communication medium between the I/O controller 117 and the graphics device 140 is lightly loaded, the data of the packet may be forwarded to the physical layer circuitry 113 of the I/O controller 117 for transmission. On the other hand, when the communication medium, or more particularly, the transmission channel(s) linking the I/O controller 117 to the graphics device 140 is heavily loaded, data transmitted from the transaction layer circuitry 111 to the data link layer circuitry may accumulate in the data transmission queue.

In addition, the data link layer circuitry 112 may receive a signal from the transmission layer circuitry 111 that may indicate a data boundary at which the data stream may be broken up for transmission across the medium. In response, the data link layer circuitry 112 may mark the data, or other nearby data, with a pointer or tag to associate the boundary with a particular piece of data. In some embodiments, the data link layer circuitry 112 may store the mark in the form of a bit in a buffer. For example, at a convenient point during a data transmission to insert a checksum or symbol, the transaction layer circuitry 111 may transmit a signal, such as a pulse, a bit, or a bit transition, to the data link layer circuitry 112. The data link layer circuitry 112 may store a bit in response to the signal, in a buffer at a location of the buffer associated with the location in the data transmission queue used to store the corresponding data from the transaction layer circuitry 111.

Verification circuitry of the data link layer circuitry 112 may receive a signal indication that data ready for transmission to the physical layer circuitry 113, may be associated with a data event and, in response, insert error verification data. For instance, when the data event marks an end of a packet, the verification circuitry may insert a checksum or symbol for transmission after the last d-word of the packet. The data link layer circuitry 112, then, may optionally use their signal to selectively create checksums or force disparity transitions, according to the policy established for balancing link bandwidth versus packet latency.

The physical layer circuitry 113 interconnecting I/O controller 117 with graphics device 140 may comprise one or more lanes to transmit and/or receive data comprising dual-simplex channels implemented as a transmit pair and a receive pair. The physical layer circuitry 113 may employ an 8b/10b encoding scheme, or similar encoding scheme, wherein data transmissions may be verified with disparity transition verifications to maintain a substantially equivalent number of logical ones and logical zeros in the data transmission. In some embodiments, where more than one lane of a communication medium may transmit data from memory controller 115 to graphics device 140, data may be disassembled into groups, such as bytes, to substantially optimize data transmission across the communication medium with the 8b/10b encoding scheme. Physical layer circuitry of graphics device 140 may reassemble the data in a manner substantially transparent to the data link layer circuitry and transaction layer circuitry.

In some embodiments, data link layer circuitry 112 of I/O controller 117 may comprise selection circuitry to select a point during the data transmission from I/O controller 117 to graphics device 140, to insert error verification data, such as a byte or a d-word, wherein the point may be based upon the association of a word in the data transmission with the last word or byte of data such as a packet. For example, selection circuitry may transmit error verification data more often when the amount of data in the data transmission queue of the data link layer circuitry 112 indicates little or no backup at data link layer circuitry of graphics device 140 and less often when the amount of data indicates that the data link layer device transmission queue of graphics device 140 may be full or nearly full. In some embodiments, wherein the transaction protocol may transmit data organized in units with one or more levels of sub-units of useable data, each level may be a data event and a point in the data transmission at which error verification data may be inserted based upon the organization of levels of data.

I/O Controller 117 may provide access to memory controller 115, memory device 120, processor 100, and graphics device 140, for I/O devices coupled with data switch 150 and PCI bridge 130. I/O controller 117 may be coupled with data switch 150 and PCI bridge 130 via transaction layer circuitry 111, data link layer circuitry 112, and physical layer circuitry 113. Further, in some embodiments, I/O controller 117 may comprise circuitry to arbitrate access for data switch 150 and PCI bridge 130 to a primary I/O bus.

Data switch 150 may be designed to interconnect several endpoint devices, such as I/O devices, with point-to-point connections to chipset 110. In some embodiments, data switch 150 may be designed to provide peer-to-peer communication between the I/O devices coupled with data switch 150, such as a mobile docking station in a gigabit Ethernet card, to avoid increasing the traffic on the primary I/O bus unnecessarily.

PCI bridge 130 may couple a PCI bus to I/O controller 117. For example, more than one agent on the PCI bus coupled with PCI bridge 130 may request a read of memory contents in memory device 120. PCI bridge 130 may accept one of the requests and forward the request to I/O controller 117 via transaction layer circuitry 131, data link layer circuitry 132, and physical layer circuitry 133. The transaction layer circuitry 131 may condition the read request into packets and transmit the data along with a signal to the data link layer circuitry 132 to associate the end of a packet with a particular byte or d-word. Data link layer circuitry 132 may comprise a buffer to maintain an association between the end of the packet and the byte or d-word. After the d-word is forwarded to I/O controller 117, verification circuitry of the PCI bridge's data link layer circuitry 132 may insert error verification data into the data transmission. I/O controller 117 may verify the data with the error verification data and forward the data to memory controller 115 in order to perform a read access of memory device 120. In some situations, I/O controller 117 may determine that an error has occurred in the data transmission and may request PCI bridge 130 to retransmit the corresponding data.

In many embodiments, transaction layer circuitry, data link layer circuitry, and/or physical layer circuitry may comprise transaction layer, data link layer, and/or physical layer software to execute on a processor and/or controller, and the circuit paths to be utilized by the software, such as memory storing software instructions and a processor to execute the instructions, may be referred to as transaction layer circuitry, data link layer circuitry, and/or physical layer circuitry. In other embodiments, some portion of the functionality of the layers may be implemented in hardware, wherein circuitry may refer to the software and/or hardware. In still further embodiments, the transaction layer, data link layer, and/or physical layer may be implemented substantially to wholly within hardware.

Figure 2:
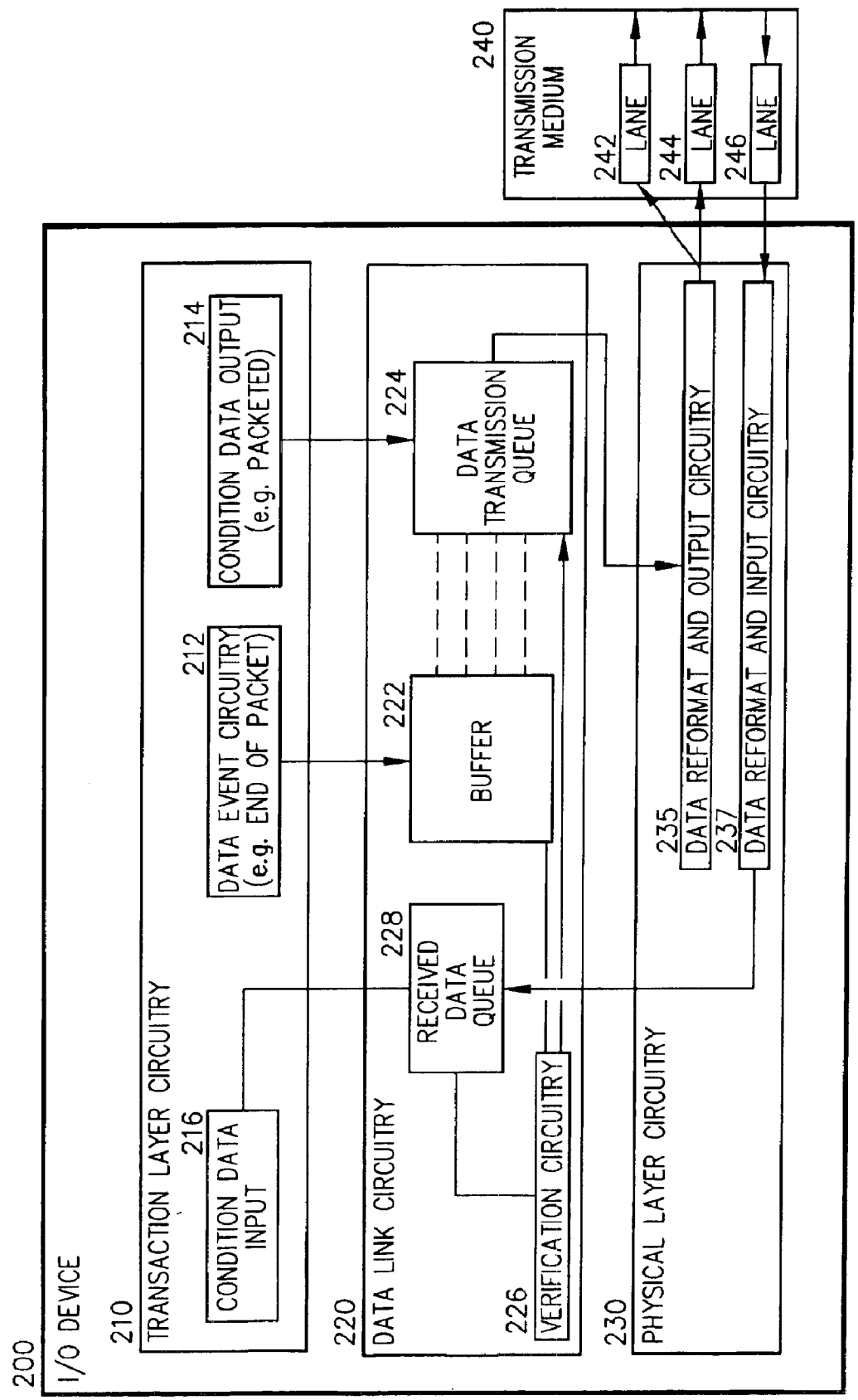
FIG. 2 depicts an embodiment to insert error verification data into a data transmission.

FIG. 2 demonstrates an embodiment to insert error verification data into a data transmission. The embodiment may comprise I/O device 200 coupled with communication medium 240 or may represent a chipset, graphics controller, PCI bridge, or switch. I/O device 200 may comprise transaction layer circuitry 210, data link layer circuitry 220, and physical layer circuitry 230. Transaction layer circuitry 210 may receive read and write requests from a software or hardware application layer and condition the requests into a format for transmission, in a form such as a packet. Transaction layer circuitry 210 may comprise data event circuitry 212 and a conditioned data output 214. Data event circuitry 212 may output a signal to indicate the occurrence of a data event in a data transmission and associate a unit of that data with the data event. Substantially simultaneously, the conditioned data output 214 may output the conditioned data to data link layer circuitry 220. For example, data event circuitry 212 may associate the last byte of a packet transmitted to data link layer circuitry 220 with a signal to indicate the end of a packet.

In some embodiments, transaction layer circuitry 210 may also comprise conditioned data input 216 to receive data transmitted by another device, such as a bridge, switch, hub, or modem, having corresponding physical layer circuitry, data link layer circuitry, and transaction layer circuitry. Transaction layer circuitry 210 may forward the data to the appropriate target device, application, or function. For instance, the data received may comprise a read request and transaction layer circuitry 210 may forward the read request to a memory controller.

Data link layer circuitry 220 may facilitate the identification of errors during a data transmission across communication medium 240 by inserting error verification data such as checksums and/or symbols that provide error detection information or that change the disparity of the data transmission, respectively. Data link layer circuitry 220 may further verify the integrity of a data transmission by verifying a change in disparity of the data transmission and/or a checksum received with the data transmission. Data link layer circuitry 220 may comprise buffer 222, data transmission queue 224, verification circuitry 226, and received data queue 228. Buffer 222 may be coupled with the data event circuitry 212 to store an indication of a data event in a data transmission and to associate the data event with a unit of data in data transmission queue 224.

Data transmission queue 224 may comprise memory to store data, such as one or more packets, until the data can be transmitted across communication medium 240. In many embodiments, data transmission queue 224 may be a serial first-in, first-out data queue having pointers to indicate the first unit of data received and the last unit of data received. In some embodiments, data transmission queue 224 may comprise a unit of memory to store error verification data to be inserted into the data transmission. In other embodiments, verification circuitry may transmit error verification data to physical layer circuitry 230.

Verification circuitry 226 may comprise disparity circuitry to generate a symbol based upon the running disparity of a data transmission and/or checksum circuitry to generate a checksum based upon the data transmitted since a previous checksum was inserted into the data transmission. In many embodiments, the disparity circuitry or checksum circuitry may transmit the error verification data with the data transmission and in some of these embodiments, the disparity circuitry or checksum circuitry may insert the symbol or checksum into the data transmission. In several of these embodiments, verification circuitry 226 may further comprise selection circuitry to select a point during the data transmission that may be optimal or substantially optimal based upon one or more criteria such as the bandwidth of the communication medium.

In some embodiments, data link layer circuitry 220 may also comprise received data queue 228 to accumulate the data received via communication medium 240. Received data queue 228 may store data to transmit to transaction layer circuitry 210. In some situations where transaction layer circuitry 210 stalls and is unable to process the data received, received data queue 228 may become full. In many of these embodiments, verification circuitry 226 may further comprise circuitry to monitor the disparity of the data placed into data queue 228 and/or circuitry to maintain a checksum of the data placed into data queue 228. When verification circuitry 226 may maintain a checksum, the checksum may be compared to data received that is identifiable as error verification data. In response to a checksum that may match the error verification data, the corresponding data of the data transmission may be verified.

In other situations, the checksum generated by verification circuitry 226 may not match the error verification data placed into received data queue 228 so response circuitry of verification circuitry 226 may initiate a request to retransmit the unverifiable data. For instance, after verification circuitry 226 may receive error verification data that modifies the disparity of the data transmission, verification circuitry 226 may recognize the error verification data as a disparity-modifying symbol and determine whether the symbol appropriately flipped the disparity of the data transmission. After a symbol causes an expected transition in the disparity, verification circuitry 226 may determine that no single-bit error has been encountered in the data transmission. On the other hand, when verification circuitry 226 may receive error verification data in the form of a checksum, verification circuitry 226 may compare the checksum to a checksum generated by verification circuitry 226. When the checksum generated by verification circuitry 226 matches the checksum received, data link layer circuitry 220 may determine that no errors of the types covered by the chosen checksum algorithm occurred in the data transmissions received by received data queue 228. In some embodiments, data received by input/output device 200 via communication medium 240 may not be used or retransmitted until the data is verified by verification circuitry 226.

Physical layer circuitry 230 may be coupled to data link layer circuitry 220 to receive data to transmit via communication medium 240 and to forward data received via communication medium 240. Physical layer circuitry 230 may comprise data reformat and output circuitry 235 and data reformat and input circuitry 237. Data reformat and output circuitry 235 may be coupled to data transmission queue 224 of the data link layer circuitry 220 to transmit data from data transmission queue 224 along with error verification data to a target device having a corresponding physical layer circuitry, or the equivalent, coupled to communication medium 240. Data reformat and output circuitry 235 may transmit data via lane 242 and lane 244 of communication medium 240, and receive data via lane 246 of communication medium 240. In situations where data reformat and output circuitry 235 may transmit data via more than one lane of a communication medium, data reformat and output circuitry 235 may modify the format of the data from data transmission queue 224 to take advantage of the bandwidth available on communication medium 240. For example, data transmission queue 224 may comprise a 4-byte wide queue and data reformat and output circuitry 235 may comprise an 8b/10b encoding scheme to transmit data across lane 242 and lane 244. Data reformat and output circuitry 235 may forward byte 1 to lane 242, byte 2 to lane 244, byte 3 to lane 242, and then byte 4 to lane 244 to encode the bytes and transmit the data serially across lane 242 and lane 244.

Data reformat and input circuitry 237 may receive a serial transmission of data via lane 246 of communication medium 240. Data reformat and input circuitry 237 may receive data encoded by a physical layer circuitry at a source device that encoded the data with an 8b/10b encoding scheme and transmitted the data serially via lane 246. Data reformat and input circuitry 237 may reassemble the data into 4-byte wide units and transmit the data to received data queue 228.

In alternative embodiments, physical layer circuitry 230 may be able to select a number of lanes available to transmit data via communication medium 240 and a source device may be able to select a number of lanes to transmit data to input/output device 200 via communication medium 240. For example, when lane 242, lane 244, and lane 246 are idle, I/O device 200 may claim lane 242, lane 244, and lane 246 to transmit data to a target device. Physical layer circuitry 230 may disassemble data units of data transmission queue 224 to optimize the use of lane 242, lane 244, and lane 246. In other embodiments, one lane of a communication medium such as lane 242 may be dedicated to transmit data from I/O device 200 to another device and lane 246 may be dedicated to transmit data from the other device to I/O device 200. In many of these embodiments, lane 244 may be selected by I/O device 200 to transmit data to the other device when the back log of data to transmit to the other device may be greater than the backlog of data to transmit from the other device to I/O device 200.

Figure 3:
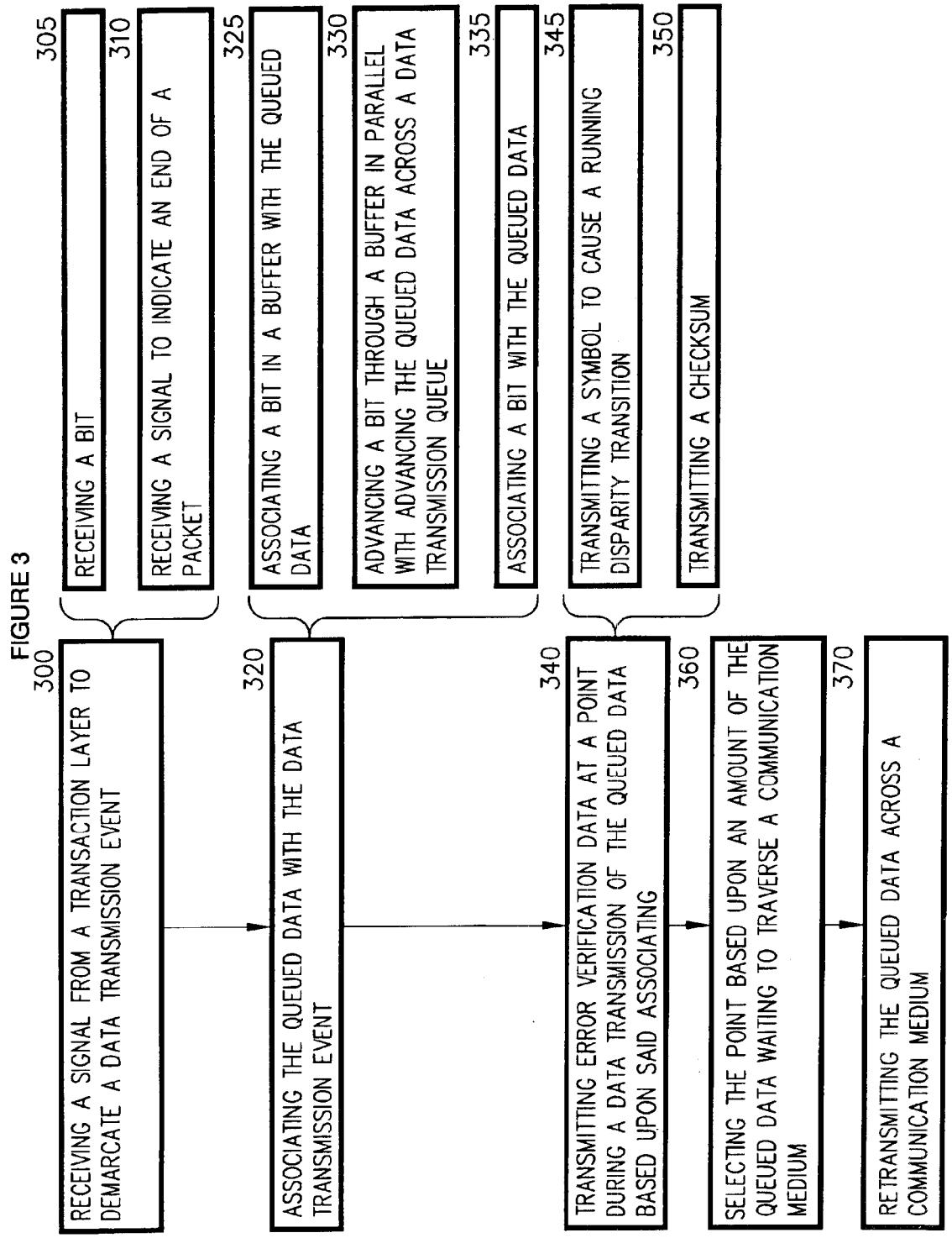
FIG. 3 depicts a flow chart of embodiments to bound data transmission latency.

FIG. 3 shows a flow chart of an embodiment to bound the latency of a data transmission. The embodiment comprises receiving a signal from a transaction layer to demarcate a data transmission event 300, associating queued data with the data transmission event 320, transmitting error verification data at a point during a data transmission of the queued data based upon said associating 340 and selecting the point based upon an amount of the queued data waiting to traverse a communication medium 360, and retransmitting the queued data across a communication medium 370. Receiving a signal from a transaction layer to demarcate a data transmission event boundary 300 may be designed to allow the data link layer to associate the unit of data with a characteristic of that data. Receiving a signal from a transaction layer to demarcate a data transmission event boundary 300 may comprise receiving a bit 305 and receiving a signal to indicate an end of a packet 310. Receiving a bit 305 may comprise receiving a series of logical zeros followed by a logical one or a series of logical ones followed by a logical zero from the transaction layer to demark data transmission event boundaries.

Receiving a signal to indicate an end of a packet 310 may receive a signal, such as a pulse or bit, to indicate that a data unit may be the last data unit of a packet or the first data unit of a packet. For example, data may be transferred to the data link layer for transmission across a communication medium and a stream of bits may be transmitted to the data link layer in parallel with the data. When the last data unit of a packet may transmit to the data link layer, the value of the stream of bits may transition such as from a logical one to a logical zero or a logical zero to a logical one. In some embodiments, the transitions in the stream of bits occur at the end of the packet such that the end of a first packet may be associated with a transition from a logical one to a logical zero and the end of a subsequent packet may be associated with a transition from a logical zero to a logical one. In other embodiments, the data stream will transition from a logical one to a logical zero and back to a logical one to demarcate a data transmission event.

Associating queued data with the data transmission event 320 may store data, set a bit, or reset a bit associated with the data to indicate a data transmission event. Associating queued data with the data transmission event 320 may comprise associating a bit in a buffer with the queued data 325, advancing a bit through a buffer in parallel with advancing the queued data across a data transmission queue 330, and associating a bit with the queued data 335. Associating a bit in a buffer with the queued data 325 may associate a location in the buffer with a location in the transmission queue. For example, the transmission queue may be 8 bytes wide and comprise rows one through N. The buffer may have bits one through N and a bit indicating a data transmission event may be stored in the first location of the buffer at the same time or substantially simultaneously with storing the data associated with the data of transmission event in the first location of the transmission queue.

Advancing a bit through a buffer in parallel with advancing the data through a data transmission queue 330 may maintain an association between the data and the data transmission event by incrementing the location of the bit in the buffer substantially simultaneously with incrementing the location of the data in the data transmission queue. Associating a bit with the queued data 335 may comprise storing data in the buffer indicating the location of data associated with the data transmission event. In some embodiments, associating a bit with the queued data 335 may comprise associating one or more bits with one or more words to maintain an association between the one or more words and the data transmission event. In many embodiments, associating a bit with the queued data may comprise maintaining a pointer to point to data associated with the data transmission event.

Transmitting error verification data at a point during a data transmission of the queued data based upon said associating 340 may insert data into the data transmission to facilitate a verification of data integrity on the receiving end of the data transmission. In some embodiments, transmitting may comprise forcing error verification data into a data transmission at the point. Transmitting error verification data at a point during a data transmission of the queued data based upon said associating 340 may comprise transmitting a symbol to cause a running disparity transition 345 and transmitting a checksum 350. Transmitting a symbol to cause a running disparity transition 345 may comprise transmitting one or more otherwise unnecessary symbols heavy with logical ones or heavy with logical zeros that flips the running disparity of the data transmission. Transmitting a symbol to cause a running disparity transition 345 may also comprise transmitting a character that is identifiable as a symbol by the receiving end of the data transmission. In many embodiments, transmitting a symbol to cause a running disparity transition 345 may comprise transmitting the symbol after transmitting the data associated with the data transmission event. In several of these embodiments, transmitting the symbol after transmitting the data associated with the data transmission event comprises transmitting the symbol after a last byte or word of a packet may transmit. In other embodiments, transmitting a symbol may comprise transmitting the symbol near the data transmission event, such as near the end of a packet.

Transmitting a checksum 350 may comprise transmitting the checksum after, or near, transmitting the data associated with the data transmission event. In some embodiments, transmitting a checksum after the data transmission event may comprise transmitting a checksum after transmitting the last byte of a packet.

Selecting the point based upon an amount of the queued data waiting to traverse a communication medium 360 may select the point of the data transmission to insert the error verification data, such as the symbol or checksum, based upon a determination of the amount of traffic being transmitted across the communication medium and/or the amount of traffic that may be handled by a receiving end of the data transmission. For example, when the data link layer may comprise a data transmission queue, the data transmission queue may remain empty or substantially empty when the amount of data being transmitted across a communication medium may be light. Further, the amount of data stored in the data transmission queue may increase with an increase in traffic across the communication medium. As a result, selecting the point based upon an amount of the queued data waiting to traverse a communication medium 360 may comprise selecting the point based upon the amount of data stored in the data transmission queue.

Retransmitting the queued data across a communication medium 370 may comprise receiving an indication that data may not verify against error verification data at the receiving end of the data transmission and a request for retransmission of the data sent between the last two insertions of error verification data. In some embodiments, retransmitting the queued data across a communication medium 370 may comprise receiving a signal indicating that a single bit error may have occurred in a data transmission between the last two transmissions of error verification data. In several embodiments, retransmitting the queued data across a communication medium 370 may comprise receiving an indication that the running disparity did not appropriately transition or the checksum received in the data transmission may not match the checksum at the receiving end of the data transmission.

Figure 4:
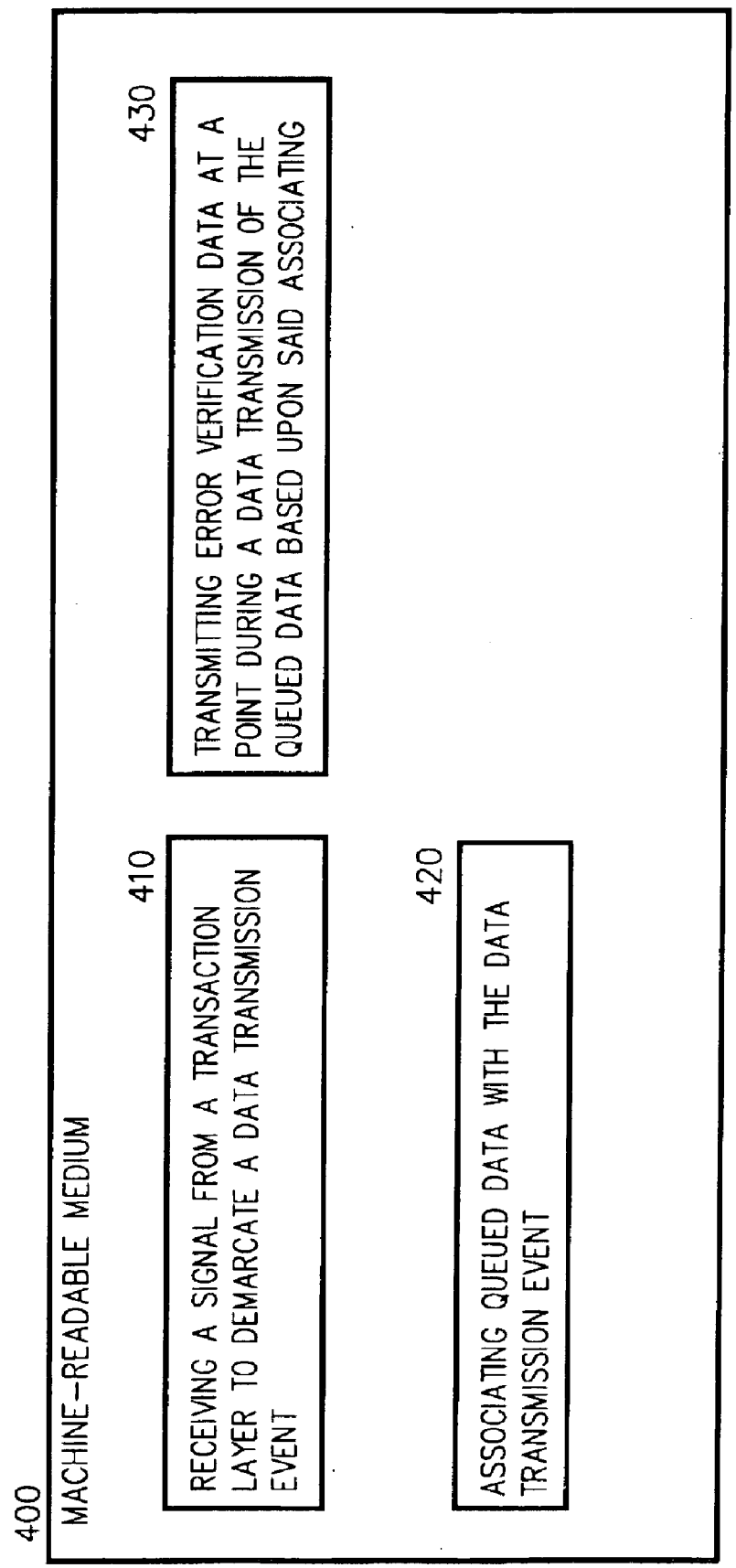
FIG. 4 depicts an embodiment of a machine-readable medium comprising instructions to bound data transmission latency.

Referring now to FIG. 4, a machine-readable medium embodiment of the present invention is shown. A machine-readable medium may include any mechanism that provides (i.e. stores and/or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 4 shows an embodiment of a machine-readable medium comprising instructions to bound data transmission latency. The machine-readable medium 400 may comprise instructions for receiving a signal from a transaction layer to demarcate a data transmission event 410, associating queued data with the data transmission event 420, and transmitting error verification data at a point during a data transmission of the queued data based upon said associating 430. Receiving a signal from a transaction layer to demarcate a data transmission event 410 may comprise instructions to inform the data link layer that a data transmission event may be associated with data transmitted to a data transmission queue. Receiving a signal from a transaction layer to demarcate a data transmission event 410 may comprise receiving a bit, pulse or bit transition from the transaction layer to indicate a data transmission event may be associated with data in the data signal. In some embodiments, receiving a signal from a transaction layer to demarcate a data transmission event 410 may comprise receiving a bit and/or signaling to indicate an end of a packet. Receiving a bit may receive a logical one or a logical zero at the same time or near the same time data may transmit to the data link layer. Receiving a signal to indicate an end of a packet may comprise receipt of a logical one or a logical zero to indicate when data transmitted to a data transmission queue corresponds with a data transmission event such as an end of a packet. Receiving a signal to indicate an end of a packet may comprise receiving a signal to indicate the first byte or bytes of a packet, or receiving a signal to indicate the last byte or bytes of a packet.

Associating queued data with the data transmission event 420 may comprise instructions for maintaining an association between data and a data transmission event. In some embodiments, associating queued data with the data transmission event 420 may comprise instructions to maintain a pointer for insertion of error verification data into the data transmission queue. Further, associating queued data with the data transmission event 420 may comprise instructions for storing an offset port data associated with the data transmission event in a buffer.

Transmitting error verification data at a point during a data transmission of the queued data based upon said associating 430 may comprise instructions to insert error verification data at a point or location in a data transmission queue based upon a pointer associated with the data transmission event. In some embodiments, transmitting error verification data at a point during a data transmission of the queued data based upon said associating 430 may comprise instructions for transmitting a symbol to cause a transition in the running disparity of the data transmission and/or instructions for transmitting a checksum with the data transmission. In many embodiments, transmitting a symbol to flip the running disparity may comprise instructions for transmitting a character having more logical zeros than logical ones or transmitting a character having more logical ones than logical zeros to change the character of the data transmission from logical one heavy to logical zero heavy, or from logical zero heavy to logical one heavy. Transmitting a checksum may comprise instructions for transmitting data having a number based upon the number of logical ones and/or logical zeros transmitted in a data transmission. Several embodiments comprise instructions for determining the data based upon the number of logical ones and/or the number of logical zeros between transmission of checksums, between transmission of checksum and the beginning of the data transmission, and/or between the transmission of the checksum and the prior error verification data transmitted with the data transmission.

In further embodiments, machine-readable medium 400 may comprise instructions for retransmitting data across the communication medium and/or instructions for selecting the point based upon an amount of the queued data waiting to traverse a communication medium. Many of these embodiments comprise receiving a data transmission comprising error verification data and several of these embodiments comprise instructions for verifying the data based upon the error verification data, as well as, instructions for requesting a retransmission of data when the data may not be verified.

What is claimed is:

1. An apparatus, comprising
   a queue to store data units to transmit across a communication medium;
   association circuitry to receive a signal from a transaction layer to indicate a data transmission event and to associate a data unit of the data units with the data transmission event in response to receiving the signal;
   verification circuitry generate error verification data for the data units in response to the association circuitry associating the data unit with the data transmission event; and
   output circuitry to transmit the data units with the error verification data across the communication medium such that the error verification data is transmitted across the communication medium at a point related to the data unit associated with the data transmission event.

2. The apparatus of claim 1, further comprising response circuitry coupled with the communication medium to request a retransmission of data across the communication medium.

3. The apparatus of claim 1, further comprising selection circuitry coupled with said verification circuitry, to select the point based upon an amount of data waiting to traverse the communication medium.

4. The apparatus of claim 1, wherein said queue comprises a first-in, first-out queue.

5. The apparatus of claim 1, wherein said association circuitry comprises a buffer coupled with the transaction layer to receive a bit to associate the data unit with the data transmission event.

6. The apparatus of claim 5, wherein the buffer comprises memory to associate the bit with a row of said queue.

7. The apparatus of claim 1, wherein said association circuitry comprises circuitry to receive the signal and to associate the signal with an end of a packet.

8. The apparatus of claim 1, wherein said verification circuitry comprises checksum circuitry to transmit a checksum.

9. The apparatus of claim 1, wherein said verification circuitry comprises disparity circuitry to transmit a symbol to cause a running disparity transition across the communication medium.

10. The apparatus of claim 1, wherein said verification circuitry comprises circuitry to retransmit the data.

11. A method, comprising:
    receiving a signal from a transaction layer to demarcate a data transmission event;
    associating a data unit of queued data units with the data transmission event; and
    transmitting the queued data units with error verification data such that the error verification data is transmitted at a point related to the data unit associated with the data transmission event.

12. The method of claim 11, further comprising selecting the point based upon an amount of the queued data waiting to traverse a communication medium.

13. The method of claim 11, further comprising retransmitting the queued data across a communication medium.

14. The method of claim 11, wherein said receiving comprises receiving a bit.

15. The method of claim 11, wherein said receiving comprises receiving a signal to indicate an end of a packet.

16. The method of claim 11, wherein said associating comprises associating a bit in a buffer with the queued data.

17. The method of claim 11, wherein said associating comprises advancing a bit through a buffer in parallel with advancing the queued data across a data transmission queue.

18. The method of claim 11, wherein said associating comprises associating a bit with the queued data.

19. The method of claim 11, wherein said transmitting comprises transmitting a symbol to cause a running disparity transition.

20. The method of claim 11, wherein said transmitting comprises transmitting a checksum.

21. A system, comprising:
    a memory device;
    a memory controller coupled with said memory device to provide access to memory contents of said memory device; and
    an input-output controller coupled with said memory controller to access the memory contents, comprising
        a queue to store data units to transmit across a communication medium;
        association circuitry coupled to receive a signal from a transaction layer to indicate a data transmission event and to associate a data unit of the data units with the data transmission event in response to receiving the signal; and
        output circuitry to transmit the data units with error verification data such that the error verification data is transmitted across the communication medium at a point related to the data unit associated with the data transmission event.

22. The system of claim 21, further comprising a processor coupled with said input-output controller to communicate with an agent coupled with the communication medium.

23. The system of claim 21 further comprising checksum circuitry to generate a checksum for the error verification data.

24. The system of claim 21 further comprising disparity circuitry to generate a symbol for the error verification data to cause a running disparity transition across the communication medium.

25. A system, comprising:
- a first input-output device to initiate a request for data units via a communication medium;
- a second input-output device coupled with said first input-output device to respond to the request with the data, comprising
  - a queue to store the data units to transmit across the communication medium;
  - association circuitry coupled with the queue to receive a signal from a transaction layer to indicate a data transmission event and to associate a data unit of the data units with the data transmission event in response to receiving the signal
  - output circuitry to transmit the data units with error verification data such that the error verification data is transmitted across the communication medium at a point related to the data unit associated with the data transmission event; and
- a processor coupled with said second input-output device to respond to the request for the data.

26. The system of claim 25, wherein said second input-output device further comprises a switch to couple a third input-output device with said processor.

27. The system of claim 25, wherein said first input-output device comprises a switch to couple a fourth input-output device with said processor.

28. A machine-readable medium containing instructions, which when executed by a machine, cause said machine to perform operations, comprising:
- receiving a signal from a transaction layer to demarcate a data transmission event;
- associating a data unit of queued data units with the data transmission event; and
- transmitting the queued data units with error verification data such that the error verification data is transmitted at a point related to the data unit associated with the data transmission event.

29. The machine-readable medium of claim 26, wherein said receiving comprises receiving a signal to indicate an end of a packet.

30. The machine-readable medium of claim 27, wherein said associating comprises advancing a bit through a buffer in parallel with advancing the queued data across a data transmission queue.

31. The apparatus of claim 1 wherein the output circuitry is to transmit the error verification after the data unit associated with the data transmission event.

32. The method of claim 11 wherein transmitting comprises transmitting the error verification data before the data unit associated with the data transmission event.

33. An apparatus, comprising
- transaction layer circuitry to encapsulate data units to transmit to a device and to detect a data transmission event of the data units;
- link layer circuitry to receive the data units encapsulated by the transaction layer circuitry and to associate error verification data with a data unit of the data units in response to the transaction layer detecting the data transmission event; and
- physical layer circuitry to transmit the data units with the error verification data to the device such that the error verification data is transmitted at a point defined by the data unit associated with the data transmission event.

34. The apparatus of claim 33, wherein the link layer circuitry is to further select the point based upon an amount of data waiting to traverse the communication medium.

35. The apparatus of claim 33, wherein said link layer circuitry comprises
- a queue to store the data encapsulated by the transaction layer, and
- a buffer to associate the error verification data with a row of the queue in response to the transaction layer detecting the data transmission event.

36. The apparatus of claim 33, wherein
the transaction layer circuitry is to encapsulate the data into packets and to detect the data transmission event in response to detecting an end of a packet, and
the link layer circuitry is to associate the error verification data with the end of the packet in response to the transaction layer circuitry detecting the data transmission event.

37. The apparatus of claim 33, wherein the link layer circuitry is to generate the error verification data such that the error verification data comprises a checksum.

38. The apparatus of claim 33, wherein the link layer circuitry is to generate a symbol to cause a running disparity transition across the communication medium.

* * * * *